(12) United States Patent
Wallace

(10) Patent No.: US 6,361,006 B1
(45) Date of Patent: Mar. 26, 2002

(54) RETAINING MEANS FOR EVAPORATIVE COOLER PADS

(75) Inventor: Allan Kenneth Wallace, Tranmere (AU)

(73) Assignee: F. F. Seeley Nominess Pty Ltd. (AU)

( * ) Notice: Subject to any disclaimer, the term of this patent is extended or adjusted under 35 U.S.C. 154(b) by 0 days.

(21) Appl. No.: 09/461,960

(22) Filed: Dec. 15, 1999

(30) Foreign Application Priority Data

Dec. 18, 1998 (AU) ............................................. PP 7791

(51) Int. Cl.⁷ .............................................. A47B 96/06
(52) U.S. Cl. ................... 248/230.7; 24/339; 248/218.4; 248/231.81
(58) Field of Search ........................ 248/230.7, 229.16, 248/229.26, 218.4, 231.81; 261/106; 62/314; 24/339, 336, 458

(56) References Cited

U.S. PATENT DOCUMENTS

| 3,962,827 A | * | 6/1976 | Chaffee ....................... 49/384 |
| 4,024,977 A | | 5/1977 | Rowley |
| 4,584,806 A | | 4/1986 | Graham, Jr. |
| 4,650,261 A | * | 3/1987 | Winter et al. ............. 24/458 X |
| 5,121,526 A | * | 6/1992 | Burkard et al. ................ 24/336 |

FOREIGN PATENT DOCUMENTS

AU    B-56251/96    11/1998

* cited by examiner

Primary Examiner—Ramon O. Ramirez
(74) Attorney, Agent, or Firm—Watts, Hoffman, Fisher & Heinke Co. LPA

(57) ABSTRACT

A retaining means for evaporative cooler pads comprising a clip wherein the clip is resiliently deformable to enable fitment between a pair of evaporative cooler pads and wherein the evaporative cooler pads are retained in position upon release of the deforming force from the clip.

The clip provides support and adjustment to evaporative pads in a single component which is easily installed and adjusted. The clips are always retained on a post inside the cooler, and thereby cannot be lost while servicing the cooler.

13 Claims, 2 Drawing Sheets

RETAINING MEANS FOR EVAPORATIVE COOLER PADS

FIELD OF THE INVENTION

The present invention relates to evaporative air coolers and more particularly to means for the retention of the porous evaporative pads in evaporative air coolers.

DESCRIPTION OF THE PRIOR ART

An evaporative air cooler operates by drawing air through a continuously wetted, porous evaporative pad which has the properties of readily distributing water throughout it's bulk, and offering low airflow resistance to the passage of air through the bulk of the pad. Evaporation of the water from the pad takes place thereby reducing the temperature of the water within the pad which then cools the air passing through the pad and causing the evaporation.

One type of evaporative pad in popular use is made from sheets of corrugated paper set at alternating angles, glued together in such a way that the contact points of the corrugations are cemented, thus producing a rigid block of the material. The blocks so produced are sawn into a rectangular cuboid shape suitable for the pad of an evaporative air cooler. The pads so produced are rigid and self supporting even when wet. They are produced commercially under the name "Celdek" and other names. They must, however, be supported in an evaporative air cooler in such a way that air can only enter the cooler through the evaporative pads. The support must be such that the pads are held firmly in place in their frames against any air pressure differential across them, and against any dislodging forces during storage, transportation and installation of the evaporative air cooler.

Various devices have been used to hold the pads in place in evaporative air coolers. A traditional method has been to surround the entire pad in a frame around the periphery, thereby providing support on all edges. This method requires a long length of support frame with corner fittings making it necessarily expensive. An alternative method of support and restraint is the subject of Australian Patent Application No. 56251/196 by F. F. Seeley Nominees Pty Ltd, in which a long pin pushed through the pad and clipped on the inside of the cooler firmly holds the pad against the pad frame. This method is considerably less expensive, but does require holes through the pad frame for the insertion of the pins. It also requires a clip to be installed as a separate part and at some cost of time for installation.

The present invention provides an alternative means for positioning and supporting pads in an evaporative air cooler. Preferred embodiments of the invention require a minimal number of parts, are easily installed, and can be readily adjusted to a range of positions to provide the optimum support for the pad.

SUMMARY OF THE INVENTION

A retaining means for evaporative cooler pads comprising a clip wherein the clip is resiliently deformable to enable fitment between a pair of evaporative cooler pads and wherein the evaporative cooler pads are retained in position upon release of the deforming force from the clip.

DESCRIPTION OF THE DRAWINGS

The present invention will now be described by way of example with reference to the drawings, in which.

Figure 1:
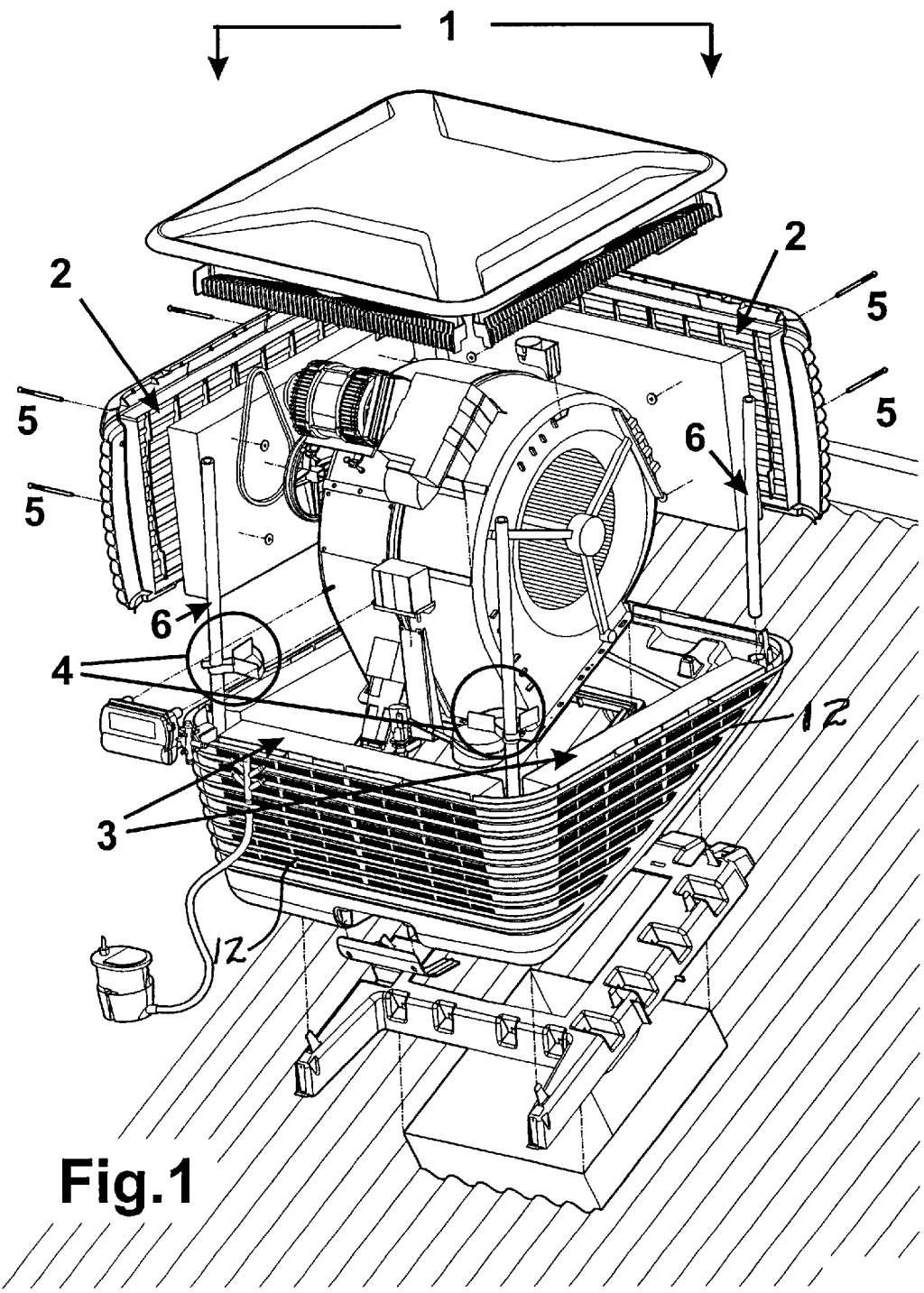
FIG. 1 is an exploded view of an evaporative air cooler, showing the fitting position of one embodiment of retaining clips in accord with the present invention.

The cooler 1 illustrated in the drawings uses two types of evaporative pad retainers. Four upper evaporative pads 2 on the upper part of the cooler are retained using pins 5 as shown in AU56251/96. A set of lower evaporative pads 3 is in the lower part of the cooler. The lower pads are retained by clips 4, which are in accord with an embodiment of the present invention. As can be seen by an examination of FIG. 1, the cooler 1 includes a housing having the usual upper and lower vertical and perforate side walls 10, 12 defining air inlet passages.

During the assembly of the evaporative air cooler, the lower evaporative pads 3 in the lower part of the cooler are fitted into position inside the housing and adjacent the lower side walls 12. As can be seen from FIG. 1, the lower pads 3 are each normal to one or two adjacent pads. The posts are then fitted and clips 4 are assembled to the posts 6. The clips 4 are then manually deformed to enable them to slide down the posts 6 into the zone occupied by the evaporative pads 3. When slid down along post 6 to the required position, the deformation of the clips is released. The clips 4 will then spring back to their normal shape, such shape providing support and retention to the evaporative pads 3 as shown in FIG. 3.

Figure 2:
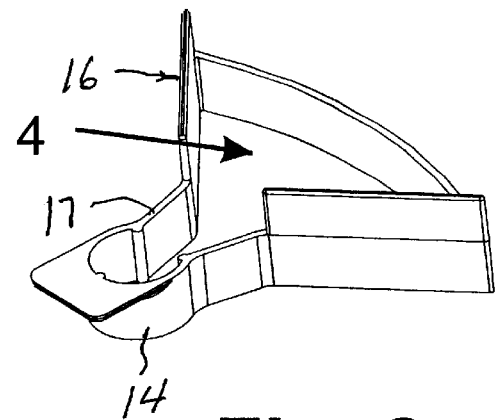
FIG. 2 is an isometric drawing of a clip as shown in FIG. 1.
Figure 3:
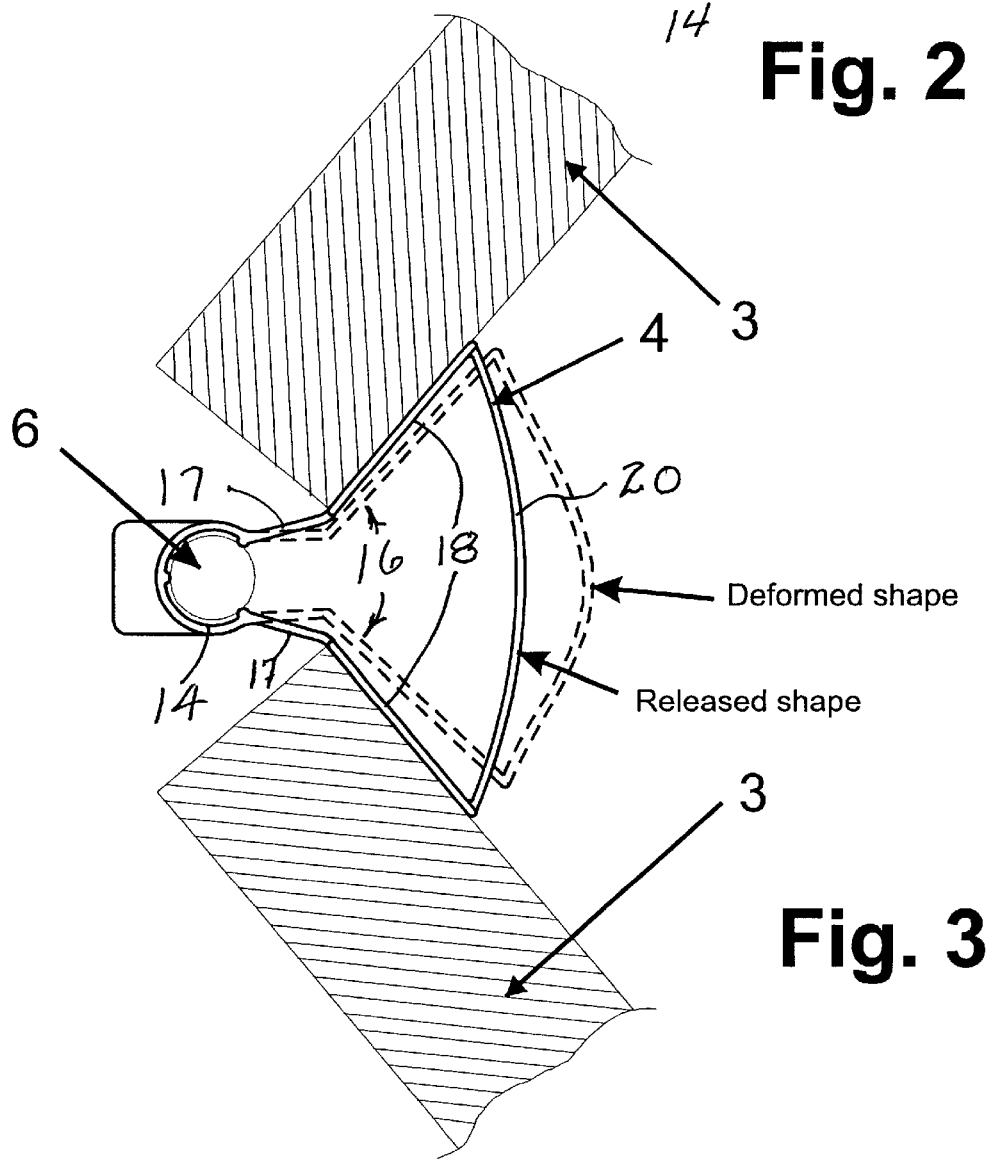
FIG. 3 is a plan view of the clip of FIG. 2 showing the fitting position of the clips relative to the evaporative pads.

Referring now to FIGS. 2 and 3 each of the clips 4 includes an arcuately contoured post engaging section 14. In cross section the post section 14 is a segment of a circle which circumscribes more than 180 degrees of the post 6. Thus the post section 14 functions as a gripping or mounting section for the clip.

A pair of resilient arms 16 project radially from the post section 14. The arms include further sections 18 projecting outwardly at obtuse angles from post arm sections 17. Remote ends of the further arms 18 are joined by an arcuate pad biasing section 20 connected to and extending between outer ends of the further arms 18. As can best be seen in FIG. 3 the arms and the biasing section have a released or rest orientation shown in solid lines in FIG. 3. The clips are resiliently deformable to the deformed shapes shown in phantom in FIG. 3 for vertically positioning the clips relative to the posts 6 and the orthogonally disposed pads 3. Thus the clips are endless flexible bands comprised of the post section 14 the resilient arms 16 and the pad biasing section or web 20.

What is claimed is:

1. For use in an evaporative cooler, a retainer comprising a resiliently deformable clip produced as a unitary component, said clip having
    a. a post gripping portion;
    b. a pair of arms extending substantially radially from said gripping portion;
    c. an arcuate web connecting the two arms
   wherein said arcuate web functions as a biasing means adapted to restore the arms to a rest orientation when said web is deformed as a result of movement of the arms from the rest orientation; and,
    d. the gripping portion, the arms and the web together being an endless flexible band.
2. The retainer as claimed in claim 1, wherein said arms are disposed in a mutually orthogonal orientation.
3. Retaining means as claimed in claim 2 wherein opposed circumferential movement of said arms in one direction from the rest orientation moves the post gripping portion to a post releasing position.

4. Retaining means as claimed in claim 1 wherein opposed circumferential movement of said arms in one direction from the rest orientation moves the post gripping portion to a post releasing position.

5. In an evaporative cooler having at least one pair of evaporative pads retained between respective arms of a retaining means, said retaining means comprising a post gripping portion gripping a post within the cooler between the evaporative pads, said arms extending radially from the post gripping portion and having an arcuate web biasing means connecting the arms wherein the gripping portion, the arms and the web together being an endless flexible band.

6. In an evaporative cooler as claimed in claim 5 wherein the evaporative pads are mutually orthogonal.

7. A process of retaining cooler pads in an operating position within an evaporative cooler comprising:
   a) mounting a pair of pads in respective, spaced operating positions;
   b) applying pressure to deform a retaining clip and moving the clip to a retaining position wherein the clip is connected to the cooler and spaced clip surfaces are each respectively near but spaced from an associated surface of one of the pads; and
   c) releasing the pressure deforming the clip thereby allowing the clip surfaces respectively to engage the associated surfaces thereafter functioning to retain the pads in their respective positions.

8. The process of claim 7 wherein the pad operating positions are orthogonal to one another.

9. The process of claim 7 wherein the moving step includes sliding the clip axially of a post forming a part of the cooler.

10. An evaporative cooler comprising:
   a) a generally rectangular housing including walls defining air inlet passages;
   b) a pair of cooler pads disposed in operative positions adjacent respective ones of the passages;
   c) a plurality of corner posts within the housing, one of the post being between adjacent ends of the pads and other of the posts being disposed near respective remote ends of the pads;
   d) a plurality of spring clips each clip being carried by a respective associated one of the posts;
   e) each of the clips retentitively engaging a face of an associated pad such that the clips function to maintain the pads in operative positions; and,
   f) each of the clips being resiliently deformable to enable pad insertion into and removal from their respective operative positions.

11. The cooler of claim 10 wherein each of the clips comprises an endless flexible band having:
   a) a mounting section configured to partially surround an associated post;
   b) a pair of arms projecting from the mounting section and being portions of the clips effecting the retentative pad engagement; and,
   c) a biasing portion interposed between ends of the arms remote from the mounting section and biasing the arms into the retentive engagement.

12. The cooler of claim 10 wherein the biasing portion is non linear.

13. The cooler of claim 12 wherein the biasing portion is arcuately curved.

* * * * *